United States Patent [19]

Iversen

[11] 3,936,645

[45] Feb. 3, 1976

[54] CELLULARIZED LUMINESCENT STRUCTURES

[75] Inventor: Arthur H. Iversen, Saratoga, Calif.

[73] Assignee: Radiologic Sciences, Inc., Santa Clara, Calif.

[22] Filed: Mar. 25, 1974

[21] Appl. No.: 454,383

[52] U.S. Cl. .................. 250/486; 250/367; 250/460
[51] Int. Cl.² ............................................ G01J 1/58
[58] Field of Search........ 250/213 R, 460, 367, 486, 250/487, 483, 366

[56] References Cited
UNITED STATES PATENTS

| 2,739,243 | 3/1956 | Sheldon | 250/367 |
|---|---|---|---|
| 2,764,693 | 9/1956 | Jacobs | 250/370 |
| 2,827,571 | 3/1958 | Klasens et al. | 250/486 |
| 3,032,657 | 5/1962 | Meier et al. | 250/486 |
| 3,169,187 | 2/1965 | Stone et al. | 250/370 |
| 3,327,122 | 6/1967 | Dueker et al. | 250/213 |
| 3,344,276 | 9/1967 | Balding | 250/460 |
| 3,369,125 | 2/1968 | Dueker | 250/213 R |
| 3,509,339 | 4/1970 | Doehner | 250/367 |
| 3,548,214 | 12/1970 | Browr | 250/213 R |
| 3,594,577 | 7/1971 | Loveday | 250/366 |
| 3,629,546 | 12/1971 | Fry | 219/121 L |
| 3,717,762 | 2/1973 | Grenier | 250/366 |

OTHER PUBLICATIONS

Laser Etchining Arragement by Harris et al., IBM. Tech. Discl. Bull. Vol. 10, No. 1, June 1967, p. 63.

Primary Examiner—Harold A. Dixon

[57] ABSTRACT

A cellularized radiation sensitive structure is provided in which a laser is utilized to cut narrow slots in a sheet of luminescent material. These slots, usually cut in an X–Y pattern, are then filled with a material which is opaque to either light or radiation or both. This forms a structure having a plurality of individual volumes of luminescent material separated by opaque material. Each of the individual volumes of luminescent material may have associated therewith a photodiode element to produce an electrical signal which is a measure of the light output from that volume.

2 Claims, 11 Drawing Figures

CELLULARIZED LUMINESCENT STRUCTURES

BACKGROUND OF THE INVENTION

1. Field of the Invention

This invention relates in general to X-ray luminescent devices, and relates more particularly to such devices using a compartmented cellularized construction.

2. Description of the Prior Art

In the field of X-ray detection, it is well known to employ so-called intensifying screens to increase the radiation available for detection purposes. Such screens contain an X-ray luminescent material which is selected to emit a relatively large number of light photons for each X-ray photon striking the material. This effectively amplifies the X-rays to be detected, since both the X-rays themselves and light emitted by X-ray induced emission from the luminescent material are available for detection on film or other detection medium or device. The primary incentive to use such intensifying screens in medical applications is to reduce the amount of X-ray radiation which is required to produce a given exposure, to thereby reduce the radiation risk to which a patient or operator is exposed.

It is known that such intensifying screens, while increasing the amount of radiation available for detection, also have the effect of reducing the sharpness of the resultant image. In general, image distortion in luminescent screens or structures is caused by the diffusion of light within the luminescent material which causes a blurring of the image with consequent loss of definition and contrast. This diffusion of light is brought about by two fundamental physical processes. The first is that as the ionizing radiation is converted into light, the direction of emission of light is random so that it is emitted approximately equally statistically in all directions. The second effect is that the high energy radiation is penetrating, the degree of penetration being dependent upon the energy of the impinging radiation and the nature of the material being penetrated. The higher the energy, the deeper the penetration.

Thus, it is seen that as visible light is generated along a path through the screen and normal to its surface, light will be radiating in all directions. Some of the light radiated at an angle off the normal to the surface of the screen will reach the film or other detecting means and result in a diffuse image.

As a result, the design of such intensifying screens has involved a trade-off between screens of large thickness, which result in increased luminescent radiation for a given X-ray level but which also produce increased image unsharpness, and screens of less thickness, which result in improved image sharpness relative to the thicker screens, but which also require more X-ray radiation to produce acceptable film images, thereby increasing the X-ray dosage to which the patient must be exposed. In practice, the thicker or high speed screens are utilized in those applications which do not require maximum image sharpness, thereby reducing the patient exposure to X-rays, while medium speed and slow speed screens are utilized when increased image resolution is required. These latter screens employ thinner phosphor layers and may incorporate dyes to minimize transverse propagation of light by attenuating such rays more than a normal ray which travels a shorter path. In general, detail or slow speed screens require approximately 8 times the X-ray dosage of high speed screens.

Several patents have proposed solutions to the problem of reducing the amount of scattered luminescent radiation which reaches the film or other detector from such screens. These patents have suggested a cellularized approach to the construction of such screens, the structure generally consisting of volumes of luminescent material separated by wall members. The wall members are disposed generally parallel to the direction of X-ray travel and their purpose is to reflect light emitted by the luminescent material and thereby prevent scattered light from reaching the detection means.

One such approach is taught in U.S. Pat. No. 3,041,456, in which a rectangular body of plastic having a luminescent phosphor dispersed therein is sliced into thin slices which are then coated on one or both sides with a reflective material. These coated slices are then bonded back together and sliced again in a direction transverse to that of the first slicing. These coating and bonding operations are repeated to produce a double laminated body from which screens of the desired thickness may be obtained.

The approach of this patent, while being theoretically attractive, presents significant problems in manufacturing because of the requirement to repeatedly handle and align extremely small pieces of the phosphor without damage or contamination.

An alternative approach is suggested in U.S. Pat. No. 3,643,092. The structures proposed there employ adjacent walls having a corrugated member disposed therebetween so as to form a plurality of chambers extending in the direction of X-ray travel. At least a portion of each of these chambers is filled with a luminescent phosphor which reacts to X-ray radiation in the manner described above to produce light. The chamber structure is such that the walls thereof, formed by the planar wall members and the corrugated member, confine and/or reflect emitted light so as to limit the amount of scattered radiation reaching the detection means.

The structures proposed in this patent, like that of U.S. Pat. No. 3,041,456, are attractive in theory but do present problems in fabrication because of the requirement to handle the small and fragile components.

Other prior art literature has suggested that chemical etching or milling be employed to produce grooves in a phosphor material, the grooves then being filled or plated with a highly reflective material to form light reflecting walls. However, this type of etching or milling produces surfaces which are relatively rough, so that even though subsequently plated or coated, they do not provide a good reflective surface. Such relatively rough surfaces have the effect of producing multiple reflections so that much of the light is lost through severe scattering.

An additional disadvantage of such chemical milling or etching is that the walls produced must be at least 0.003 – 0.010 inches thick in order to provide sufficient strength for handling of the structure. Walls of this thickness are discernable and result in corresponding lines appearing in the image on the film, thereby reducing the resolution. Additionally, walls of this thickness reduce the amount of available phosphor by a corresponding amount, thus reducing the light output from the structure. Further, these structures have the disadvantage that the circumference of walls are continuous and rigid, so that when the phosphor cures after being poured or impregnated into the cells, shrinkage or expansion may occur. This often results in fracturing of the phosphor, with a resultant poor light transmission due to the separated interface at the fracture.

SUMMARY OF THE INVENTION

An idealized cellularized screen should have the following characteristics. First, the dimensions of the cell should be small enough to be virtually indistinguishable so as to reduce or eliminate the effect of wall thickness on the resultant image. Secondly, the wall surfaces should be of a specular or near specular nature so that light emitted at an angle from the normal to the screen surface will be reflected from the highly reflective wall, and some of this reflected light will be directed to the screen surface to provide further light output to the recording medium.

In accordance with the present invention, there are provided a number of novel structures utilizing luminescent materials in the detection of X-rays for medical or other purposes. In one embodiment of the invention, a cellularized luminescent structure is produced which provides ease of manufacture and results in greatly improved operation. In accordance with this embodiment, a conventional intensifying screen has a plurality of spaced slots scribed or cut therein in the luminescent material, and these slots are then filled with a suitable light-opaque material. Ideally, two groups of slots are formed, the slots of one group being normal to those of the other group, so as to produce a grid effect on the luminescent material. The filling of the slots in this manner forms light barriers between the adjacent segments or volumes of luminescent material, serving the function of the walls of the prior art cellular devices described. A structure of this type eliminates the need for individually fabricating the luminescent elements and walls, and permits the wall elements to be made as thin as can be achieved by precision cutting or scribing equipment. Because the luminescent material is supported by the surrounding support member, problems of fragility of the resulting structure are eliminated.

Another embodiment of the invention, particularly adapted for industrial applications, utilizes a novel cellularized luminescent structure in conjunction with charge coupled devices or arrays of silicon photo detectors to produce equipment which is highly useful in X-ray detection. These silicon photodetectors are now commercially available with as many as 1024 image elements on a single wafer, each of the elements being as small as 0.001 inch by 0.001 inch. In the use of such devices, the image of an object being scanned is broken into a large number of small elements, each of which is represented by a separate electrical signal and may be treated electrically in any desired fashion.

In theory, such devices would be highly desirable for use in directly detecting X-rays in industrial and medical applications, since they would permit examination in segments as small as the silicon detector elements themselves. However, in practice there are two related problems which prevent the use of such devices directly with X-rays. First, the conversion efficiency of such devices is very low because the detecting layer is relatively thin and of low atomic weight. Thus, the devices would require intense X-ray radiation to produce usable signals. Secondly, the high X-ray radiation required to produce usable signals would quickly result in destruction of the device surface.

In accordance with the present invention, the advantages of these charge coupled devices are obtained by interposing a cellularized phosphor structure between the X-rays to be detected and the charge coupled devices. The X-rays impinge on the phosphor material to produce the emission of light photons. The use of phosphors in this manner results in high gain, since each X-ray photon at 100 KV will produce emission of approximately 3000 light photons, and also has the advantage that since substantially all of the X-ray photons are converted to visible light, the silicon detector face is not damaged by impinging X-rays.

The structures of this invention are designed so that substantially all of the visible light generated above a given photo diode detector element is directed toward that element, and that much of the off-axis visible light radiation generated in the structure is directed toward the detector element. Further, cross-talk between different elements is minimized, and oblique or off-axis ionizing radiation is attenuated to prevent the generation of visible light over two or more detecting elements. Additionally, the structures of the present invention are such that a wide range of different fluorescent or luminescent materials may be employed therein.

In accordance with one embodiment of the invention, a cellular structure is provided having a cellular element centered over each photo diode detector element. Each cellular element has optically opaque walls to prevent light diffusion to adjacent cellular elements, and if desired, the cell walls may also be of radio-opaque material to minimize the penetration of oblique or off-axis radiation into adjacent cellular elements. Also, the cell walls are preferably made of a highly reflective material to reflect oblique light rays toward the detecting element.

Each cellular element is preferably in direct contact with the surface of its associated detector element to provide maximum optical efficiency. The use of such cellular structures, if provided with appropriate enclosures, permits the use of luminescent or fluorescent materials in solid, gas or liquid forms.

In an extension of the present invention, fiber optic techniques may be employed to improve the structures. Since currently available photodiode arrays have a maximum length of one inch, there may be applications which require detectors in excess of that length. To provide such structures, fiber optic techniques may be utilized to couple light from the cellular structures of this invention to the photodiodes. In this type of embodiment, the photodiodes are not directly adjacent or in contact with the cellular structures but are spaced therefrom and coupled thereto through fiber optics. This permits the photodiodes to be spaced so as not to interfere with each other while still permitting X-ray detection of small segments through the use of a cellular structure.

In an additional embodiment of the invention, cellular structures of this invention are utilized in conjunction with photoconductor-electroluminescent (PC-EL) devices or layers. Such PC-EL structures are used in many applications, such as solid-state radiographic amplifier screens to produce a visible image. By utilizing the cellular structures of this invention as inputs to such PC-EL devices, a high definition light input is obtained.

It is an object of this invention to provide a celluarized luminescent screen or structure of arbitrary thickness so as to convert substantially all incident ionizing radiation to visible or near visible light.

It is another object of this invention to provide a luminescent cellularized screen having cells of such small dimensions so as to be virtually indistinguishable to the naked eye.

It is a further object of this invention to provide a cellularized screen having cell walls of such small thickness as to be indistinguishable to the naked eye and such that the surface area of the screen is predominantly phosphor material.

A still further object of this invention is to provide cell walls of desired radio-opacity so that either a highly radio-opaque material may be used to obtain a "Bucky Grid" effect to reduce scattered radiation, or a low or intermediate absorption material may be employed, as need dictates.

It is yet another object of this invention to provide a mechanical structure for a cellularized luminescent screen such that when the phosphor impregnant compound shrinks or expands due to curing or solidifying, the cellular structure will "give" with the impregnant, thereby eliminating fracturing of the phosphor compound or separation of the phosphor impregnant from the cell walls so as to retain optimum light transmission to the phosphor surface.

DETAILED DESCRIPTION OF THE INVENTION

Figure 1:
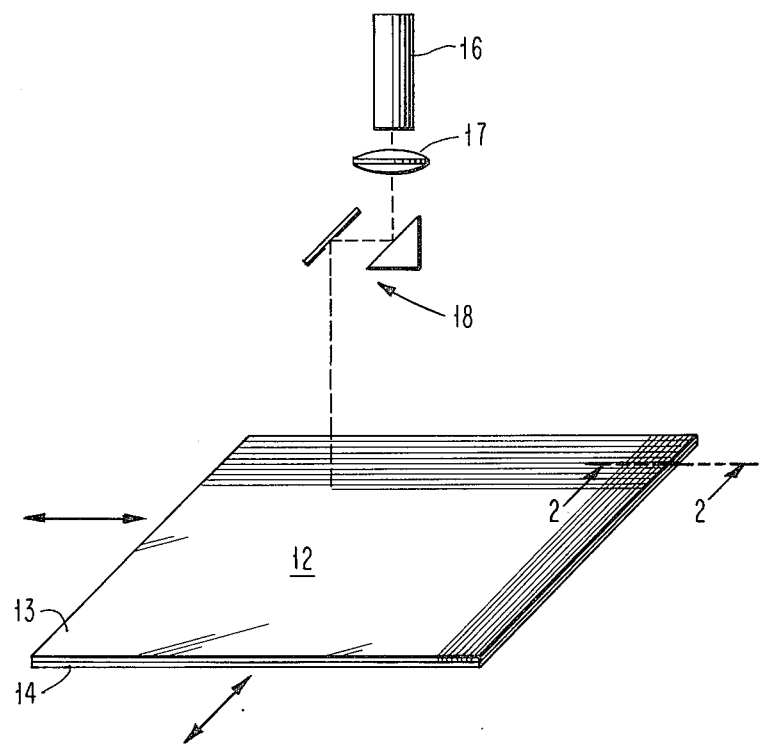
FIG. 1 is a perspective view showing one method of providing a grid pattern of slots in an intensifying screen as a step in producing a cellularized screen in accordance with this invention.

Referring to FIG. 1, there is shown a conventional intensifying screen 12 which may be used to form a cellularized screen in accordance with this invention. Such a screen may be of any suitable type commonly employed in intensifying the image in X-ray film exposure and development. The screen includes a layer 13 of a suitable luminescent material, such as calcium tungstate or doped zinc sulphide, placed on a suitable base 14.

To produce a cellularized screen in accordance with this invention, slots are formed in the luminescent layer 13 of screen 12 in a grid or X-Y pattern. Such slots may be formed by any suitable means, such as by the use of a $CO_2$ laser 16. Such lasers are commercially available and are capable of producing slots as narrow as 0.003 inch in width and to less than 0.001 using suitable masking techniques.

As discussed above, a narrow width is ideal for the walls of a cellularized screen since it reduces the wall thickness so as to make it virtually indistinguishable to the naked eye and on the resulting image and also maximizes the amount of phosphor material available for light emission on the screen.

Such a laser may be employed as shown diagrammatically in FIG. 1 to produce a series of closely spaced slots in both the X and Y directions on the phosphor material 13 of screen 12. Preferably a lens and mirror system is employed, as shown by elements 17 and 18, to accurately focus and narrow the beam of laser 16 to the desired width. Masking techniques may be employed to narrow the width of the slots which are produced in layer 13. A suitable highly light reflective material, such as gold, may be deposited on the surface of layer 13 and photoetching techniques employed to remove this material in areas corresponding to the location of the slots. When the laser is then swept across the structure, the laser beam is reflected by the highly reflective material but scribes or cuts into layer 13 in those areas where the reflective material has been removed by etching. Thus, the slots cut may have a width limited only by the resolution of the photoetching techniques in removing the material corresponding to the desired slot widths.

As an alternate to the above etching technique, light modulation devices may be interposed between material 13 and the laser system to blank off the laser beam between slot areas to prevent cutting in areas of material 13 other than the assigned slot areas. Such a light modulator might be, for example, a rotating or otherwise movable disk having openings for the passage of the laser beam, these openings being interspersed with solid areas which reflect the laser beam. In this structure, the rotating disk would alternately permit passage therethrough of the laser beam when the beam is positioned adjacent the area where slots are to be cut, and block and reflect the beam in all other areas. Laser 16 thus acts as an essentially massless slotting saw to form the extremely narrow slots in the phosphor material 13. Preferably, these slots are cut to a depth which extends partially into base layer 14. This insures that after filling of the slots with opaque material, there will be no leakage of light between adjacent cells through phosphor 13.

After cutting the slots in the desired X-Y pattern, they may be filled with a material to form the cellular structure. Preferably, vacuum impregnation techniques are employed to fill the slots with a material which is either optically opaque or optically and radio opaque. Examples of optically opaque but radio transparent material are carbon, powdered aluminum or other low atomic number materials. Suitable materials which are both optically and radio opaque are powdered lead or lead oxide, powdered tungsten or tantalum mixed with an appropriate plastic medium which may then be cast. The use of such radio opaque materials provides a Bucky grid effect in the resulting structure to reduce scattered radiation.

Figure 2:
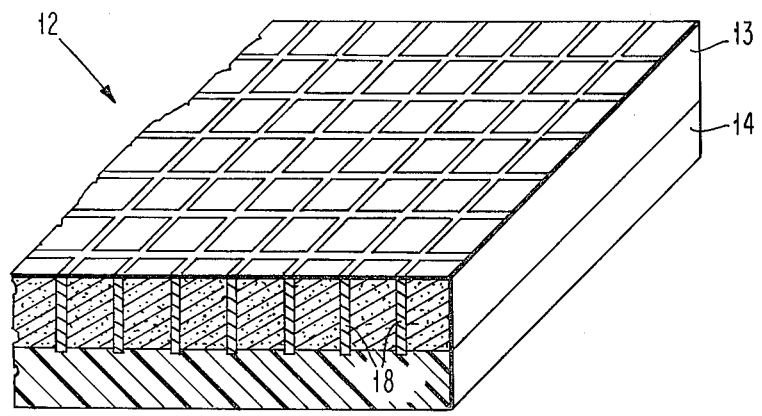
FIG. 2 is a perspective view, partly in cross section, of a portion of the structure of FIG. 1 after the slots have been filled with an opaque material to produce a cellularized screen.

After vacuum impregnation, the resulting structure appears as in FIG. 2, with the slots filled with material 18. Material 18 forms walls which produce cells or volumes of phosphor material 13. By way of example, the filled slots may have a width of 0.001 inches, while the phosphor material between adjacent slots may have a width of 0.005 inches. It will be seen that this structure provides essentially individual volumes or cells of phosphor material 13 which are separated from each other by wall members formed by opaque material 18. This construction provides the advantages discussed above of confining light generally to a given phosphor volume in which it originated, thereby increasing the resolution of the resultant image.

Figures 3, 4:
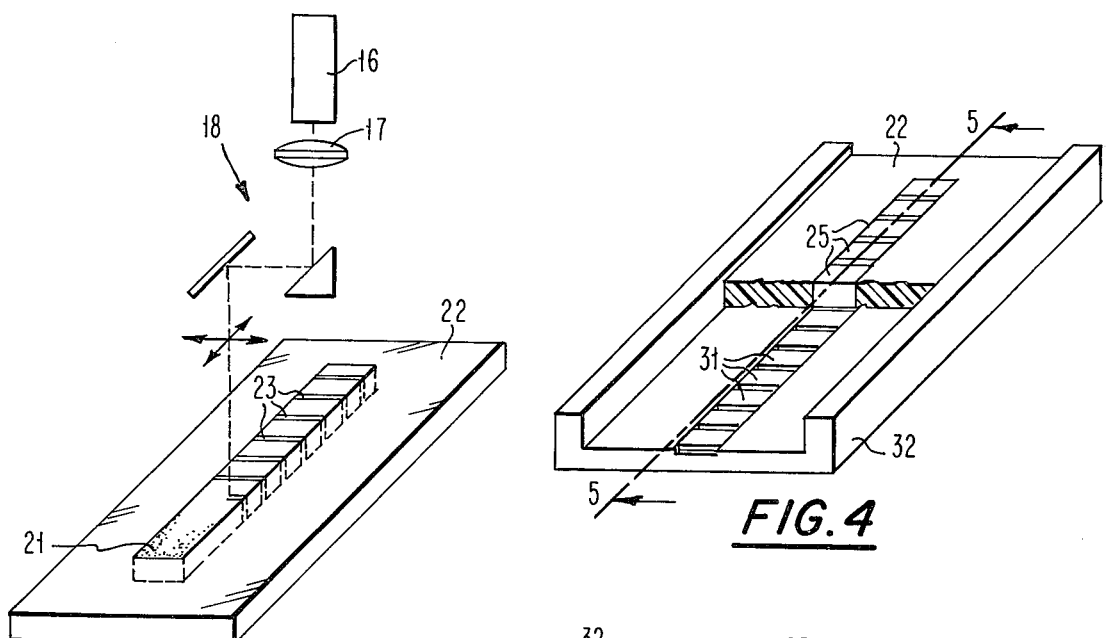
FIG. 3 is a perspective view showing the cutting of slots in a phosphor member for use with a linear array of photodiodes.
FIG. 4 is a perspective view, partly in cross section, showing the luminescent structure of FIG. 3 bonded to a structure containing photodiodes to produce a linear detector array.

FIG. 3 illustrates the formation steps in an alternate embodiment of the invention particularly suited for use as a linear detector in conjunction with photodiodes. As shown there, a slice of phosphor material 21 is placed in an encapsulating material 22. The slice of phosphor material 21 may be of any suitable type, such as cesium iodide, and may have been formed by being sliced, such as by a $CO_2$ laser, from a larger piece of cesium iodide. Typically, phosphor slice 21 may be 1 inch long, 0.005 inches wide and 0.020 inches high. Slice 21 may be encapsulated in material 22 using vacuum chamber techniques, after which the resulting structure may be double disk ground on the top and bottom surfaces until the cesium iodide surfaces are exposed.

The next step in the fabrication may be to provide spaced slots in slice 21. These slots may be provided, as in the embodiment of FIGS. 1 and 2, by means of $CO_2$ laser 16 and the lens-mirror elements 17, 18 or suitable masking. Also, suitable masking or beam interruption techniques as discussed above, may be employed to provide slots of minimum thickness. By this means, a plurality of spaced slots 23 are cut in slice 21. The slots 23 preferably extend completely through slice 21 so as to eliminate the possibility of light travelling between adjacent blocks or cells of the phosphor material.

The next step in the fabrication is to fill slots 23 with a suitable material 25 to form walls. As with the embodiment of FIGS. 1 and 2, the material selected to fill slots 23 may be either optically opaque or both optically and radio opaque. Suitable vacuum impregnation techniques may be employed to fill slots 23 with the desired material. After this filling, the top and bottom surfaces may be again ground to expose the cesium iodide surfaces.

After trimming to size, the structure 22 is ready to be placed adjacent the photodiodes to form a detector array. As shown in FIG. 4, the photodiodes 31 may be mounted in a support member 32 and arranged in a linear fashion along a central portion thereof. Photodiode arrays of this configuration are available commercially. An example of such an array is one manufactured by Reticon Corporation as a linear photodiode array, Type RL–1024B. Such arrays include not only the photodiode but much of the associated electronics.

Figure 5:
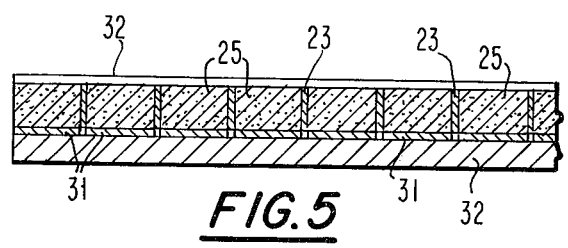
FIG. 5 is a cross-sectional view along plane 5—5 of FIG. 4 showing the alignment of the cellular elements with the photodiodes.

The photodiode structure 32 has a U-shaped cross section as shown, and structure 22 is trimmed to fit within this opening so as to place each cellular element of phosphor immediately over an associated photodiode 31 as best shown in FIG. 5. The position of structure 22 relative to photodiodes 31 may be adjusted to the desired position by monitoring the output of diodes 31 while irradiating structure 22 with X-rays, structure 22 being moved longitudinally thereof until maximum electrical output is obtained from diodes 31. This condition should represent the optimum coupling between the phosphor cell members and their associated photodiodes, and structure 22 may then be bonded to the photodiode structure 32 to form the completed linear detector array.

Such an array may be used in many applications where a high resolution X-ray detector device is required. For example, in food and drug packaging applications, such a detector array, configured to any desired length, may be employed to monitor fill, product mix and particulate contamination, with a resolution of 0.004 inches or better. By supplying the output from photodiodes 31 to a computer or other analyzing device, fully automated operation is possible.

An additional application is in production line batch processing or continuous sheet processing, where the mix or thickness of the sheet or other parameters may be monitored by computer with appropriate feedback to other stages of manufacture or process control. By utilizing soft X-rays for thin or low density materials, coating thickness and gauge profile of products such as magnetic tape may be monitored.

Figures 6, 7:
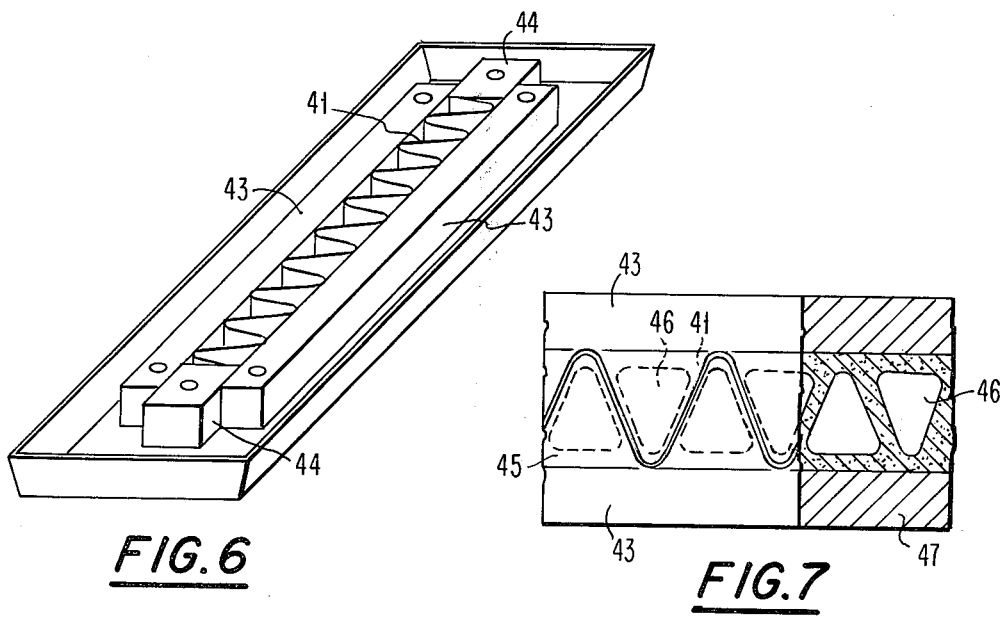
FIG. 6 is a perspective view showing the forming of a structure utilizing a corrugated strip to provide a cellularized structure for use with a photodiode array.
FIG. 7 is a plane view, partly in cross section, showing a portion of a cellularized detector of FIG. 6 in association with photodiodes.

FIGS. 6 and 7 illustrate an alternate embodiment of the invention directed to a detector array. In this embodiment, the walls of the cellular structure are formed by a serpentine or accordian member 41. Member 41 may be a strip of suitable metal which will form a light opaque, and if desired, radio opaque barrier between adjacent cell members in the resulting structure. Member 41 may be formed, for example, by taking a strip of suitable metal and passing it between gear teeth to produce the resultant accordian or serpentine configuration.

To form the cellular structure of this invention, serpentine member 41 may be placed in an alignment fixture having top and bottom members 42, 43 and end or spacer pieces 44. Spacer pieces 44 serve to separate top and bottom members 42, 43 by an amount sufficient to allow serpentine member 41 to be placed therebetween in the configuration shown in FIG. 6. By way of example, the spacing between members 42, 43 may be 0.005 inches, while their depth and that of serpentine member 41 may be .050 inches and the thickness of serpentine member 41 may be 0.0005.

After positioning member 41 in the alignment fixture, vacuum techniques may be employed to place a suitable phosphor mixed with plastic or plastic scintillator 45 into the structure until it completely fills the area within the alignment fixture and covers serpentine member 41. The structure may then be removed and the surfaces ground until the upper and lower surfaces of serpentine member 41 are exposed.

The ground structure is then placed adjacent an array of photodiodes, in a manner similar to that described above for the embodiment of FIG. 5. Such photodiodes, as shown in FIG. 7, may be a group of diodes 46 arranged in a linear array and mounted in a support structure 47. The size of the area between adjacent convolutions in serpentine member 41 are chosen so as to correspond approximately to the surface area of a diode unit 46, and by suitable alignment of the serpentine structure relative to the diodes, these elements can be matched up as shown in FIG. 7. As before, this alignment may be performed by irradiating the structure with X-rays, monitoring the output of diodes 46 and moving the serpentine structure relative to the diode array until maximum output from the diodes is obtained. At this maximum output position, the serpentine structure may be bonded to the diode array to form the aligned device.

It will be seen from FIG. 7 that this structure provides a cellular construction, with serpentine member 41 forming walls separating adjacent volumes of phosphor material 45. Thus, light generated within a given volume of phosphor will be confined thereto, since any off-axis light will be reflected by light opaque member 41 and should ultimately reach the associated diode 46 for detection. Further, if serpentine member 41 is formed of radio opaque material, any scattered or secondary X-rays in a given volume of phosphor will be confined to that volume by the reflecting or absorbing properties of material 41.

The structure shown in FIGS. 6 and 7 is well suited for use when the particular configuration of the diode array matches that desired. However, since presently available diode arrays have a maximum length and number of diodes, there may be applications where other configurations are desired for detection purposes. To accommodate such applications, the structure shown in FIGS. 8 and 9, employing fiber optics, may be utilized.

Figure 8:
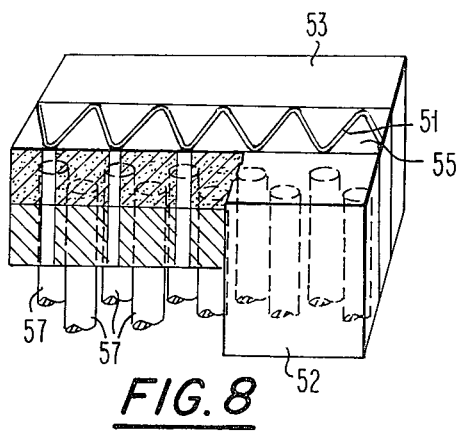
FIG. 8 is a perspective view showing the use of fiber optics in conjunction with a structure as in FIG. 7.

As shown in FIG. 8, a structure somewhat similar to that shown in FIGS. 6 and 7 is first formed, utilizing a serpentine member 51. Member 51 is placed in an alignment fixture formed by top and bottom members 52, 53, and phosphor material 55 is placed in the structure using vacuum techniques. As before, this produces a cellularized structure, with the convolutions of member 51 forming walls which optically separate adjacent volumes of phosphor 55. However, instead of directly coupling the phosphor volumes to photo diodes, as in the embodiment of FIGS. 6 and 7, fiber optic members are employed for such coupling. As best shown in FIG. 8, the end of a fiber optic member 57 is placed adjacent and preferably in contact with each phosphor volume. As is well known in the art, such fiber optic materials are commercially available in substantially any desired configuration.

Figure 9:
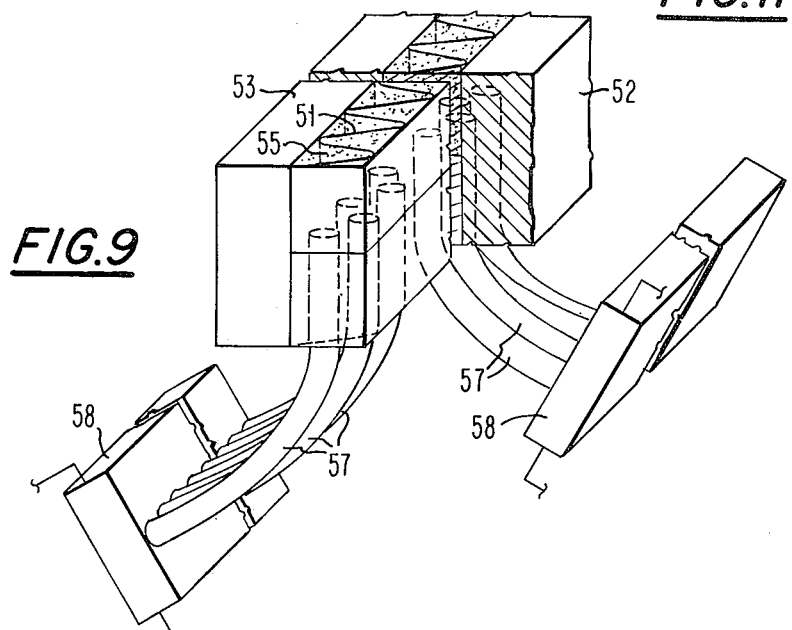
FIG. 9 is a perspective view showing the structure of FIG. 8 and its associated photodiode detectors.

The other end of each member 57 may be brought out so as to optically couple the light from phosphor 55 to photodiodes 58. By shaping members 57, photodiodes 58 need not conform to the configuration of the phosphor volumes, and such diodes may be configured in any appropriate fashion and in any required number. As shown in FIG. 9, the end of each member 57 is placed adjacent the light sensitive surface of an associated photodiode 58. In one particularly advantageous arrangement, a first group of fiber members 57 are brought out to an associated photodiode 58 disposed on one side of the cellular structure, and a second group of fiber members 57 are brought out to an associated photodiode 58 mounted on the opposite side of the cellular structure. This permits interleaving of photodiodes on opposite sides of the cellular structure, and prevents physical interference between adjacent diode arrays because of their size.

Figure 10:
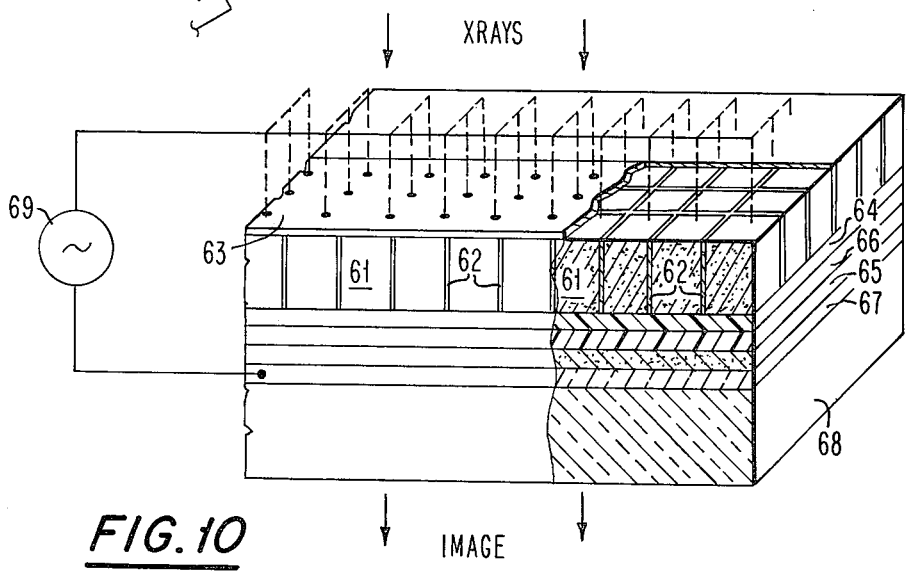
FIG. 10 shows the cellularized structure of this invention utilized in conjunction with a PC-EL device for intensifying X-ray images.

FIG. 10 illustrates an alternate embodiment of the invention directed to photoconductor-electroluminescent (PC-EL) structures such as are employed in solid state radiographic amplifier screens to produce an intensified image of the irradiating X-ray pattern. As is well known in the art, such structures employ a photoconductive layer which is exposed to the radiation to be detected and changes its photoconductivity in response thereto. This change in photoconductivity is translated into variations in the voltage applied to an associated electroluminescent layer, which in turn varies its light output as a function of applied voltage. The light output from the electroluminescent layer provides the image which is detected.

It has been proposed in U.S. Pat. No. 3,388,256 to employ a luminescent material in association with the photoconductive material to enhance the photoconductive effect produced by the irradiating radiation to thereby increase the light output from the structure.

This same principle is employed in the novel arrangement shown in FIG. 10 which employs a cellularized structure in accordance with this invention. The cellular structure shown there is similar to that shown in FIG. 4 comprising volumes of a suitable phosphor material 61 separated by wall members 62. As shown, these slots are formed in an X-Y or grid pattern on a suitable phosphor member. For example, the phosphor member may be an intensifying screen in which an X-Y pattern of slots is formed as shown in FIGS. 1 and 2. This structure may be formed as described above by scribing slots in the phosphor material such as by laser, and filling the slots with a suitable optically and, if desired, radio opaque material.

This cellular member may then be provided with a very thin coating of photoconductive material 63 on the upper surface thereof. This member is then placed on a layer 64 which serves to optically isolate the cellular structure from the underlying electroluminescent layer 65. Layer 65 may be separated further from the cellular structure by an opaque insulating layer 66. Under EL layer 65 is a phototransparent electrode member 67 which in turn is supported on a phototransparent support member 68. A source of alternating current energy 69 is connected to transparent electrode 67 and to the photoconductive layer 63. Discrete electrodes 70 may be provided at spaced points along the surface of photoconductive layer 63 to provide for connection of source 69 to this layer. Such electrodes may be formed, for example, by metal vaporizing, adhestise silver paint or the like.

In operation of the device, X-ray radiation strikes photoconductive layer 63 and produces some change in the photoconductivity thereof. Additionally, some X-ray radiation passes through thin photoconductive layer 63 and strikes phosphor material 61 in the cellular structure to produce light, in a manner similar to that described above for the other embodiments. That portion of the light emitted by phosphor 61 which strikes photoconductive layer 63 produces photoconductive effects in this material in addition to those produced by the X-ray radiation. The photoconductive effect exhibited by material 63 is considerably enhanced by the light from phosphor over what that effect would be in response to X-ray radiation alone.

The variations in photoconductivity of layer 63 in response to irradiating X-rays and the light generated in phosphor 61 in response to the X-rays result in variations in the voltage applied to different portions of the EL layer 67 to thereby vary the light output from different portions of this layer. As a result, the light generated by EL layer 67 corresponds in pattern and intensity to the X-rays irradiating PC layer 63 and phosphor 61, the effects being greatly enhanced by the action and cellular structure of this invention.

Further, by virtue of the cellularized structure, the effects of light from phosphor 61 on the photoconductive layer are generally confined to the portion of the photoconductive layer immediately over a given phosphor volume in the cellular structure, thus increasing the resolution of the resulting image.

Figure 11:
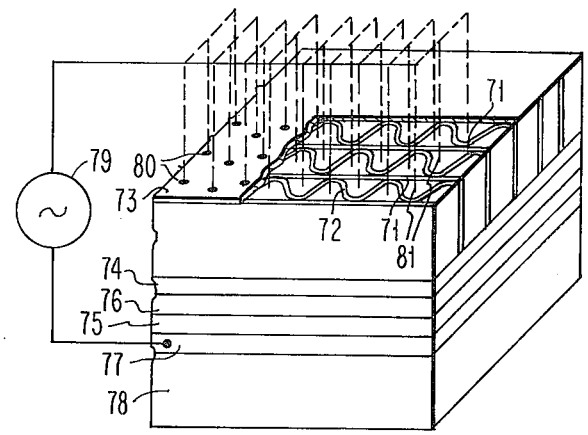
FIG. 11 shows an alternate PC-EL structure.

FIG. 11 illustrates an alternate embodiment for use in a PC-EL structure for detecting X-rays. The structure shown there includes a cellularized structure which is formed by spaced wall members 71 interleaved with serpentine members 72. Wall members 71 and serpentine member 72 have their long dimension extending in the general direction of X-ray travel. The spaces in this structure are filled with a suitable luminescent phosphor 81 so as to form volumes of phosphor, each of which is separated from adjacent phosphor volumes by the walls formed by wall members 71 and the convolutions of serpentine member 72. Thus, these walls, which are made of a suitable light opaque, and if desired, radio opaque, material act to substantially confine light to the given volume of phosphor in which it was generated. If the walls are also radio opaque, they further act to confine X-ray radiation to each volume of phosphor, thereby reducing or eliminating the effects of secondary radiation.

This cellularized structure is associated with PC-EL elements similar to those shown and described in connection with FIG. 10. This includes an EL layer 75 which is separated from the cellularized structure by insulating layers 74 and 76. The structure includes a transparent electrode member 77 which is supported on a phototransparent member 78.

A layer of photoconductive material 73 is placed on the upper surface of the cellular structure and a source of alternating current energy 79 is connected to the EL layer 75 and to the PC layer 73. Electrical connection may be made to different points on PC layer 73 by means of discrete electrodes 80 which are provided at spaced points on the surface of layer 73.

The structure of FIG. 11 operates in a manner similar to that described above for the embodiment of FIG. 10 to detect X-rays which strike PC layer 73 and luminescent material 81 and produce variations in the photoconductivity of layer 73. The photoconductive variations are transformed into corresponding variations in the electrical potential across EL layer 75. This, in turn, produces variations in the light emitted by EL layer 75, thereby producing an enhanced or intensified image of the X-rays striking the device.

It will be apparent that many changes can be made in the embodiments of the invention without departing from the spirit of the invention.

For example, the cellularized structure of FIGS. 3, 4 and 5 may be employed with light fiber members. In such an embodiment a plate member is provided having the light fibers fixed therein, one end of each light fiber member being positioned to be adjacent a luminescent volume of the structure of FIG. 3 when that structure is placed on the light fiber structure. The other ends of the light fiber members may be brought out to photo detector devices in a manner similar to that shown in FIG. 9.

Additionally, the shape of the luminescent material volumes may be other than the rectangular or X–Y grid pattern shown in the structures of FIGS. 2 and 10. For example, other shapes such as hexagonal or orthogonal may be employed. To produce these shapes, a photo-etched pattern of the desired configuration can be placed on the luminescent material as described above. A $CO_2$ laser may then be scanned across the surface in a raster type scan, the laser beam being reflected on those areas containing the reflective material and cutting into the luminescent material in those areas in which the reflective material has been etched away. This allows many different patterns to be utilized without requiring that the device used to cut the slots, such as the $CO_2$ laser, be controlled to exactly follow the exact pattern.

I claim:

1. A structure for responding to X-ray radiation, comprising
   a cellularized member of luminescent material which emits light in response to X-ray radiation, said member comprising a plurality of volumes of said luminescent material separated by wall members,
   a photoconductive layer disposed on one surface of said cellularized member to be exposed to X-rays,
   an electroluminescent layer disposed on the opposite side of said cellularized member from said photoconductive layer, and
   a source of electrical energy connected to said photoconductor and said electroluminescent material,
   said luminescent material emitting light in response to X-ray radiation to vary the photoconductive effect exhibited by said photoconductive layer, said variations in photoconductive effect producing variations in the potential across and the electroluminescence of said electroluminescent layer.

2. Apparatus in accordance with claim 1 in which said volumes of luminescent material are formed by pairs of wall members having a serpentine member disposed therebetween, the luminescent material being disposed in the spaces between said wall members and said serpentine member.

* * * * *